July 15, 1947. H. S. CAREY 2,424,077
CONSTANT TENSION JIG SAW
Filed Dec. 26, 1944
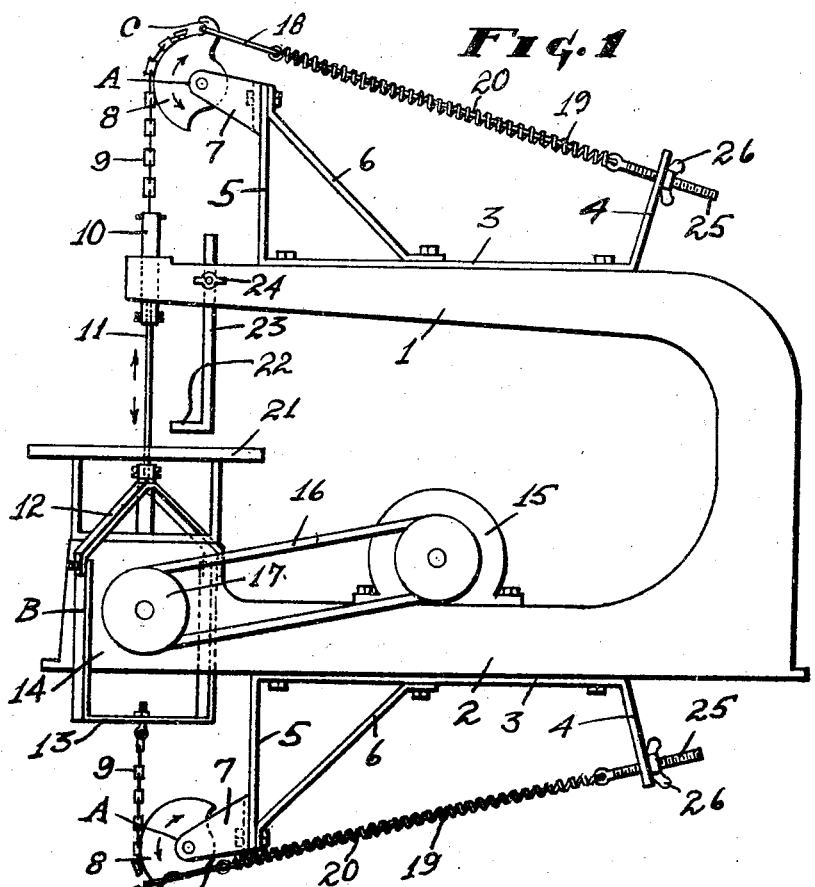
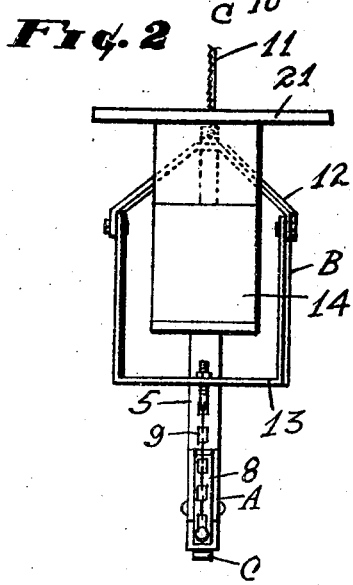
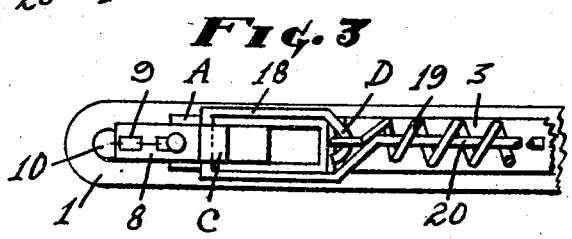
INVENTOR.
H. S. CAREY
BY U. G. Charles
Atty.

Patented July 15, 1947

2,424,077

UNITED STATES PATENT OFFICE 2,424,077

CONSTANT TENSION JIG SAW

Harlan S. Carey, Wichita, Kans., assignor to Ernest Lee Carey, Wichita, Kans.

Application December 26, 1944, Serial No. 569,743

3 Claims. (Cl. 143—73)

The invention herein disclosed relates to useful improvements in jig saws and has for its principal object a means to tension the saw blade equally from one maximum stroke through to the other, in other words, the tension on the blade is the same at all positions through its vertical strokes to obviate pulsative vibration, whereby the motor rotation is uniform when the saw is remaining idle.

A further object of this invention is to eliminate arm reciprocal movement carrying the saw blade tensioned between one of its corresponding ends whereby the vertical movement is arcuate while in my invention the saw blade movement is rectilinear, the arms being spaced apart vertically and rigidly secured while the blade is tensioned by coil springs mounted on their respective arm brackets and adapted to rock roller sectors in the same direction and to which the ends of the saw blade are removably secured for vertical reciprocation actuated by a motor.

These and other objects will hereinafter be more fully described, reference being had to the accompanying drawing forming a part of this specification and wherein like characters will apply to like parts in the different views.

Referring to the drawings:

Fig. 1 is a side view of the invention, the carrying frame of the jig saw being omitted.

Fig. 2 is a side view of the yoke arrangement showing the crank box between the legs of the yoke.

Fig. 3 is a top view of the spring bail and wheel sector.

As a more concise description of the invention, it will be seen that the structure comprises a pair of arms 1 and 2, respectively, each arm having a bracket 3 secured thereto and extending oppositely from each other on a vertical plane said bracket being similar in form, consequently the following description will be upon one of said brackets and in which it will be seen to consist of a base member lying on its arm and secured thereto rigidly, the rear end portion 4 of which is bent upward and rearwardly to function as an anchor for a tensioning spring later described. At the other end of the base member is an upturnedly extending portion of its length as at 5, said portion being supported at right angle to the base by a brace member 6 to secure the same as carrying means for a bearing bracket 7, the outer portion of which is bifurcated to provide legs A spaced apart and between which is trunnioned a roller sector 8 having a chain 9 secured thereto at one of its ends for peripheral engagement to vertically move the other end portion, the end of which is detachably secured to the upper end of a guide pin 10 that slidably engages reciprocatingly with a smooth sliding fit in an aperture through the forward end of the upper arm 1 while the lower end of said pin is arranged to removably carry the upper end of a saw blade 11, the lower end of which is removably secured to the apex of a tie bar 12, the ends of said tie bar being secured to the legs B of a yoke 13 that straddles a crank box 14 to maintain alignment of the saw blade between the roller sectors on arms 1 and 2 as the same are vertically aligned and the said yoke 13 at its lower extremity being secured to its respective roller sector by a similar chain to that for the upper end of the saw blade.

To drive the saw blade a conventional crank arrangement is housed in the box and being power driven by a motor 15 having a belt 16 to engage on a pulley 17 that drives the crank.

To tension the saw blade it will be seen that the upper and lower sectors each have a bail 18 to straddle the same and being rockably secured thereto by a hook C integrally joined adjacent one terminal end of the sector's periphery as shown in Figs. 1 and 3 for the purpose later described, while the crotch ends D are secured to one end of coil spring 19, the other ends of which are secured to their respective anchors 4. To avoid whipping vibration of the spring there is positioned a rod 20 within the coils of the spring, one end of the rod being secured to the bail to slide freely in the coils of the spring as the same is stretched and retracted by the rocking movement of the roller sectors which in turn responds to the reciprocal movement of the saw blade as driven by the motor.

It will be seen in Fig. 1 that the saw blade extends through a table 21 carried by the crank casing to function as a rest on which to place work being cut or sawed, said work being secured against upward movement by an adjustable pressure foot 22 that is carried by arm 23 that is slidably arranged on the upper arm and being secured by a winged set screw 24.

While the jig saw is in action as driven by its motive power, the roller sectors will respond to the reciprocating vertical movement of the saw blade in which instant the said roller sectors will be rocked correspondingly in the same directions reciprocatingly while the springs alternate in their action to maintain a uniform tension for the saw blade during its entire length of strokes.

This I accomplish by the springs hook-up to their respective roller sectors, in which case it will be seen that the leverage on the spring as the bail approaches the turning axis of the roller sector will increase in proportion to the increase of the tension of the spring as the roller sector turns, and vice versa when the roller sector turns in the opposite direction, therefore the upper and lower roller sectors being oppositely hooked up will coact against each other for a uniform tension at all times for the blade through its movement. As tensioning means for the spring there is provided a threaded anchor rod 25, one end of which is secured to its respective end of the spring while the other or threaded end portion engages through an aperture in the upper end of the anchor member 4 and being tensioned by a wing nut 26.

Such modifications may be made in the invention thus described as lie within the scope of the appending claims, and having thus described my invention what I claim as new and desire to secure by Letters Patent is:

1. In a jig saw, a pair of arms horizontally disposed and spaced apart substantially in parallelism and being joined at one end of their corresponding ends, the other ends being free, a bracket secured to each arm adjacent their free ends, said brackets extending oppositely, a roller sector journalled on each bracket, the arcuate face of the sectors being aligned, means to suspend a saw blade between the sectors to move the blade in a vertical plane reciprocatingly, and power means to actuate the movement of the saw blade, coil springs having one of their ends secured to their respective brackets while the other ends are secured to the sectors to tension the saw blade, said springs being connected to the sectors in such a way as to stretch the saw blade with equal tension at all times as the blade moves from one sector toward the other reciprocatingly, the equal tension being through the principle of loss of purchase at one sector as said spring rocks toward the turning axis of the sector, while the other spring is rocking outward from the turning axis of the other sector and losing its tension simultaneously with the loss of purchase and vice-versa, reciprocatingly, whereby the saw blade is equally tensioned in both directions along its entire movement to avoid pulsative movement as driven.

2. In a jig saw, as recited in claim 1, each spring having a rod extending therethrough, one end of each rod being secured to one end of the spring to avoid excess vibration as the spring moves laterally, and means to adjust the tension of the springs.

3. In a jig saw comprising a frame having an upper and a lower horizontal member, a vertically positioned saw blade and upper and lower guide elements positioned in the upper and lower members to reciprocatingly carry the saw blade, a pair of brackets carried by the upper and lower members and extending upwardly and downwardly, respectively, from the members, a roller sector and means to rockably mount a roller sector to each outward extension of the brackets, the peripheral contacting surface of the sectors being vertically aligned with each other and with the guide elements, a chain connecting each guide element with its respective sector, the connection to the sector being outward from the turning axis of the sector with respect to the guide element, a hook formed on each sector adjacent the connection for the chain but outward therefrom, a spring for each sector, one end of each spring having a loop to straddle its hook, the other end being adjustably carried, said hooks alternatingly moving toward and from the frame to provide a loss of purchase of one spring with an increase of tension, while the other spring has an increase of purchase with a loss of tension of the spring, whereby the force required to reciprocate the saw blade through its entire movement is constant.

HARLAN S. CAREY.

REFERENCES CITED

The following references are of record in the file of this patent:

UNITED STATES PATENTS

| Number | Name | Date |
| --- | --- | --- |
| 199,845 | McChesney | Jan. 29, 1878 |
| 1,852,193 | Schneider | Apr. 5, 1932 |
| 192,597 | Penney | July 3, 1877 |
| 32,507 | Barraud | June 11, 1861 |
| 182,743 | Beach | Oct. 3, 1876 |
| 322,748 | Perry | July 21, 1885 |
| 663,871 | Curley | Dec. 18, 1900 |

FOREIGN PATENTS

| Number | Country | Date |
| --- | --- | --- |
| 18,477 | Great Britain | Oct. 3, 1895 |